United States Patent
Zhou et al.

(10) Patent No.: US 11,308,047 B2
(45) Date of Patent: Apr. 19, 2022

(54) DATA ACCESS AND RECOMMENDATION SYSTEM

(71) Applicant: SAP SE, Walldorf (DE)

(72) Inventors: Panfeng Zhou, Dublin, CA (US); Vivek Kandiyanallur, San Francisco, CA (US); Colin Florendo, Marlborough, MA (US); Robert Schulze, Walldorf (DE); Zheng-Wei She, Shanghai (CN); Yanhong Wang, Dublin, CA (US); Amarnadh Sai Eluri, Mountain House, CA (US)

(73) Assignee: SAP SE, Walldorf (DE)

( * ) Notice: Subject to any disclaimer, the term of this patent is extended or adjusted under 35 U.S.C. 154(b) by 224 days.

(21) Appl. No.: 16/816,511

(22) Filed: Mar. 12, 2020

(65) Prior Publication Data

US 2021/0286777 A1 Sep. 16, 2021

(51) Int. Cl.
*G06F 16/00* (2019.01)
*G06F 16/21* (2019.01)
*G06F 16/22* (2019.01)
*G06N 5/04* (2006.01)

(52) U.S. Cl.
CPC .......... *G06F 16/213* (2019.01); *G06F 16/221* (2019.01); *G06F 16/2255* (2019.01); *G06N 5/04* (2013.01)

(58) Field of Classification Search
None
See application file for complete search history.

(56) References Cited

U.S. PATENT DOCUMENTS

| 7,499,907 | B2* | 3/2009 | Brown | G06F 16/2272 |
| 7,831,592 | B2* | 11/2010 | Markl | G06F 16/24539 |
| | | | | 707/718 |
| 7,966,343 | B2* | 6/2011 | Yang | G06F 16/221 |
| | | | | 707/791 |
| 8,290,935 | B1* | 10/2012 | Lopes | G06F 16/2453 |
| | | | | 707/718 |
| 8,983,985 | B2* | 3/2015 | Chen | G06F 16/221 |
| | | | | 707/757 |
| 9,953,054 | B2* | 4/2018 | Collins | G06F 16/2255 |
| 2009/0083215 | A1* | 3/2009 | Burger | G06F 16/2462 |
| 2014/0317087 | A1* | 10/2014 | Collins | G06F 16/2255 |
| | | | | 707/715 |

* cited by examiner

*Primary Examiner* — Jean M Corrielus
(74) *Attorney, Agent, or Firm* — Sterne, Kessler, Goldstein & Fox P.L.L.C.

(57) ABSTRACT

System, method, and various embodiments for providing a data access and recommendation system are described herein. An embodiment operates by identifying a column access of one or more data values of a first column of a plurality of columns of a table of a database during a sampling period. A count of how many of the one or more data values are accessed during the column access are recorded. A first counter, corresponding to the first column and stored in a distributed hash table, is incremented by the count. The sampling period is determined to have expired. A load recommendation on how to load data values into the first column based on the first counter is computed. The load recommendation for implementation into the database for one or more subsequent column accesses is provided.

20 Claims, 3 Drawing Sheets

DATA ACCESS AND RECOMMENDATION SYSTEM

BACKGROUND

One of the main challenges in improving memory and other computing resource utilization in data processing systems is in determining how much data to load into a memory location. If too much data is loaded, resources are wasted because the loaded data is never used. On the other hand, if too little data is loaded, resources are also wasted because multiple data reads and copies from disk storage to memory may be necessary.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing a data access and recommendation system.

One of the main challenges in improving memory and other computing resource utilization in data processing systems is in determining how much data to load into a memory location. If too much data is loaded, resources are wasted because the loaded data is never used. On the other hand, if too little data is loaded, resources are also wasted because multiple data reads and copies from disk storage to memory may be necessary.

Figure 1:
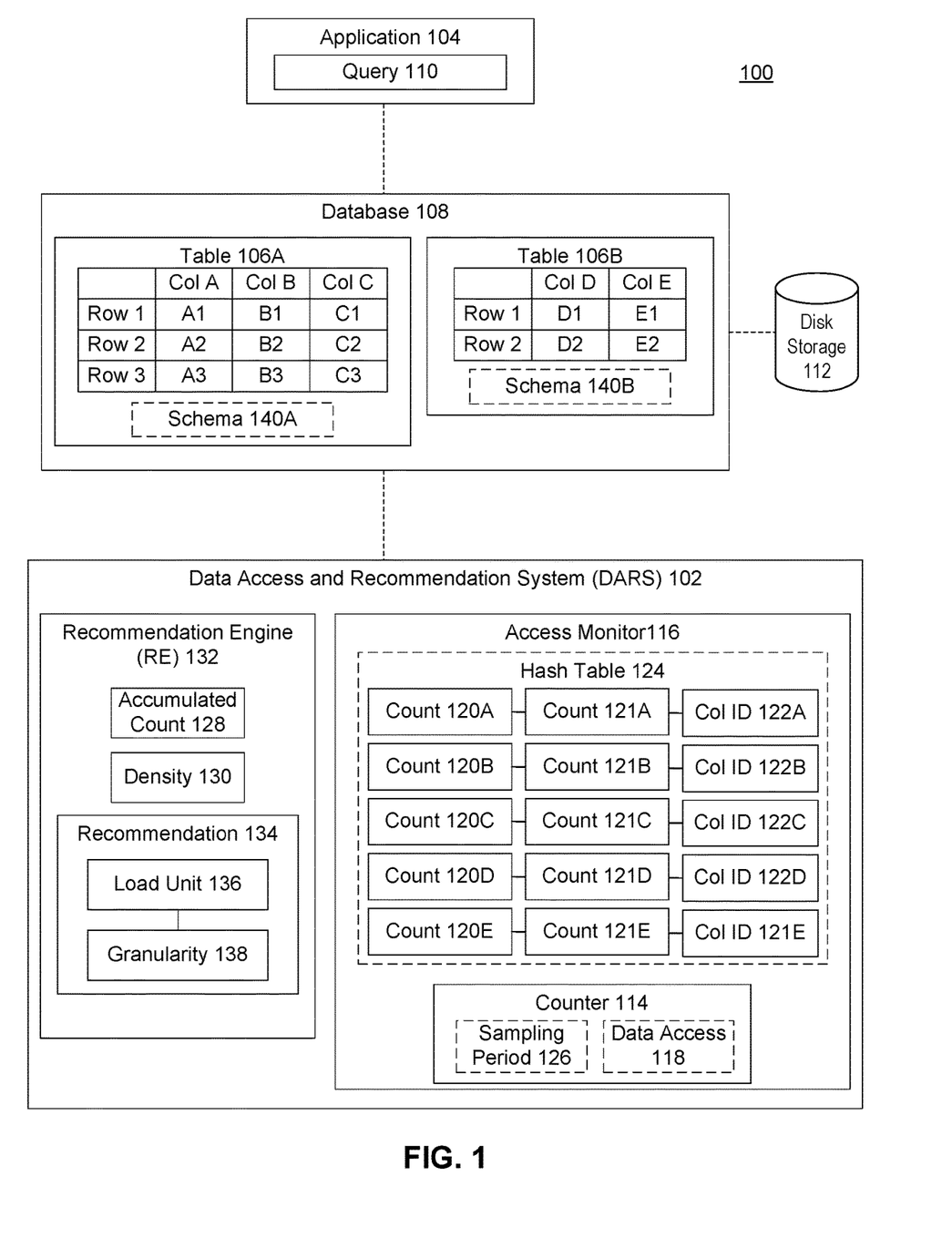
FIG. 1 is a block diagram illustrating example functionality for providing a data access and recommendation system (DARS), according to some embodiments.

FIG. 1 is a block diagram 100 illustrating example functionality for providing a data access and recommendation system (DARS) 102, according to some embodiments. DARS 102 may monitor how data is being accessed or memory is being utilized within a system, and recommend (and/or implement) improvements to increase the memory utilization and/or improve the efficiency of data access.

These changes or recommendations may result in improving system resource utilization rates, reducing resource consumption, and increasing system throughput by saving unnecessary computing cycles and other resources from being wasted with more inefficient memory utilization and data access techniques. This may result in improved productivity, and may allow organizations to save money and/or increase profitability.

In an embodiment, an application 104 may request data from a database 108, by submitting one or more queries 110 to database 108. Application 104 may include a system, program, app, or user that requests access or permission to read (and/or write) data to or from database 108. In an embodiment, database 108 may simultaneously receive and process multiple queries 110 from many different types of applications 104.

Query 110 may include any request for information from database 108. In an embodiment, query 110 may include parameters that are used by database 108 to identify which information or data from which tables 106 (i.e., tables 106A, 106B) of database 108 satisfy the parameters of query 110. Database 108 may then return the identified data to application 104 (or another location), responsive to the query 110.

In an embodiment, database 108 may be a column-store, in-memory database that reads and copies data from a disk storage location 112 into one or more memory locations, organized into different tables 106A, 106A each with its own columns and rows where data is stored across various data records. The data of database 108 that is copied into or stored into memory may be used to process and respond to the queries 110 received from one or more applications 104.

To perform query processing, database 108 may move or copy data back and forth between tables 106 (which may be stored across one or more memory locations, across one or more database servers or processors) and one or more disk storage locations 112. While memory may provide for faster, more efficient access to data, relative to disk storage 112, the amount of memory available is both limited in quantity and more expensive relative to that of disk storage 112. As such, to manage the memory efficiently, database 108 may balance between how much data (from disk storage 112) is loaded into and out of memory in processing (or anticipation of processing) queries 110. Queries 110 may then be processed against in the in-memory data that is organized across various columns and rows of various tables 106.

In an embodiment, an access monitor 116 may monitor the various operations performed by database 108 in processing queries 110, including the loading and unloading data from memory and/or disk storage 112, and how the data from memory is accessed during the query processing operations. As will be discussed in greater detail below, based on this monitoring of database 108 by one or more access monitors 116, a recommendation engine (RE) 132 will compute or formulate a recommendation 134 on how to improve the data access, data load and unload, and/or memory utilization operations during query processing for database 108. DARS 102 may either implement the recommendation 134 and improve the utilization of database 108, or provide the recommendation 134 for a user or administrator to implement.

In an embodiment, access monitor 116 may detect various data access operations 118 that are performed by database 108. A data access 118 may include any operation that results in the reading, scanning, and/or returning of a data value from a particular column of database 108 (e.g., as part of query processing). In an embodiment, a counter 114 may track the detected data accesses 118 on a per-column basis, and may store or maintain the counts 120, 121 for each column's data access 118 in a hash table 124. For example, if database 108 reads and/or returns the records A1, B2, B3, and E2 responsive to processing a query 110, counter 114 may record a count of: 1 (data access 118) for column 2, 2 for column B, and 1 for column E.

In the example of FIG. 1, only a single access monitor 116 and corresponding counter 114 are shown, however DARS 102 may use multiple different access monitors 116, each of which corresponding to a column of database 108, and all of which write to the same hash table 124. In another embodiment, different counters 114 may be used for each monitored or accessed column.

In an embodiment, DARS 102 may use different access monitors 116 or counters 114, each of which may be configured to detect or record different types of data accesses 118. For example, a first counter 114 (or access monitor 116) may be a scan counter that counts each data value that is read or scanned from a column during the processing of a query 110. For example, in returning value B3 responsive to a query 110, database 108 may also scan values B1 and B2, as such the count may be three (for each of the read and/or returned values) for a scan counter 114.

A second example counter may be a counter for single-row look up data accesses. For example, query 110 may identify one or more data values by row, column, and/or table 106 to be returned; the second lookup counter may record an increment of 1 for each individually identified data value. In other embodiments, other types of access monitors 116, counters 114, and/or data accesses 118 may be implemented.

In an embodiment, access monitor 116 may monitor database 108 using any combination of various monitoring or statistical analysis techniques. For example, access monitor 116 may request or receive operational statistics that the database 108 itself is configured to track in performing data load (unload) and data access operations. Example operations may include tracking which data and how frequently data is requested from disk storage 112 and stored into one or more tables 106, how often and which columns of the tables 106 are created and removed, which data of which columns are actually accessed or processed when processing queries 110, and which data is actually returned as an answer to a query 110.

Access monitor 116 may record the various types of monitored or detected data accesses 118 for the columns of the tables 106 of database 108 using one or more counters 114. In an embodiment, each counter 114 may store their count values 120A-120E, 121A-121E in a hash table 124. In the example shown, only one counter 114 is illustrated, which may store counts 120A-120E, however a second counter (not illustrated) monitoring or detecting a different type of data access may store second count values 121A-121E across one or more of the columns (as indicated by col IDs 122A-E).

The count values 120, 121 may be a running count for a number of data accesses 118 that were detected on a corresponding column of one of the tables 106 by a particular counter 114. For example, while count 120A may correspond to a first type of data access 118 from a first counter 114, count 121A may correspond to a second type of data access 118 from a second counter 114.

In an embodiment, the counts 120A-E and 121A-E may be stored with corresponding col IDs 122A-E. A col ID 122 may be an identifier used to identify the particular table 106 and column corresponding to the count 120, 121. For example, col ID 122A may correspond to col A of table 106A, and may include the counts 120A and 121A.

Hash table 124 may be a statistics cache used to capture or store data access statistics about the various columns and tables 106 of database 108. In an embodiment, hash table 124 may be data structure that maps keys to values and uses a hash function to compute an index into an array of buckets from which the desired value can be found. In an embodiment, hash table 124 may be a distributed hash table 124 that synchronizes data across multiple different database 108 nodes, servers, or computing devices which are being (simultaneously) accessed during the processing of one or more queries 110.

The hash key for hash table 124 (which may be col ID 122) may include components such as a table identifier, a partition identifier, and/or a column identifier. The count values 120, 121 may then be stored in hash table 124 as a hash value. In the example illustrated each col ID 122 is illustrated as being associated with two count values 120, 121 in the same hash table 124, in other embodiments, two different hash tables 124 may be used, each hash table including a col ID 122 and a single count value (either count 120 or count 121, or an accumulated count value of both counts 120 and 121).

In an embodiment, the counters 114 may actively count data accesses 118 during a specified data collection or sampling period 126. The sampling period 126 may either indicate an amount of time, or a minimum number of data access operations 118 that may need to be monitored in order to accumulate enough data to make a meaningful recommendation 134. In an embodiment, DARS 102 or an administrator may take into account the size of database 108, the size of memory or disk storage 112, the average system throughput or number of queries 110, how many processors or servers are executing, the day of the week, the available bandwidth, historical data, and other factors to determine the length of sampling period 126.

In an embodiment, if at the end of a sampling period 126 there is not enough data collected to make a requested recommendation 134, DARS 102 may inform the user, continue counting data accesses 118 until a threshold amount of data has been accumulated, or restart the sampling period 126. In an embodiment, a user may enter how long to extend the sampling period 126. In another embodiment, DARS 102 may proceed to determine recommendation 134 and notify the user that particular recommendations 134 did not have enough data to be meaningful.

In an embodiment, at the beginning of sampling period 126, hash table 124 may be empty. Then, for example, each time data from a new column (a column not previously accessed during the current sampling period 126) is accessed, a new entry for the column may be created in hash table 124. Then, if the column is subsequently accessed, the existing count value 120, 121 is incremented by the counter value. This may save processing resources as DARS 102 will not need to filter through columns with zero accesses during sampling period 126, which saves reading, writing, storage, and processing resources. Further, writing to a cache or hash table 124 location may consume fewer resources than storing similar information in an attribute of a table 106.

In an embodiment, hash table 124 may only store access counts 120A-E, 121A-E and their corresponding col IDs 122A-E without other database processing statistics or other information. This targeting the use of hash table 124 for count information and to exclude non-count related data may allow DARS 102 to perform quicker lookups and count accumulation which may be performed at the conclusion of a sampling period 126. Because, for example, if a hash table stored additional non-count related data, then accumulation processing (as will be discussed in greater detail below) would necessarily take longer, consume more resources, and cause delays while reducing system throughput. This problem would become more pronounced as the amount of data, the number of columns, the number of tables 106 grows into the thousands, millions, and tens of millions, or more.

In an embodiment, storing counts 120, 121 in a hash table 124 may be preferential to storing counts in an attribute of database 108, associated with each column. Because as noted above, during query processing or normal operations, database 108 may add and remove which columns are retrieved from disk storage 112 and stored in memory. Because of limited memory space, not all of the columns of database 108 may be stored in memory simultaneously. However, when a column is removed from memory, its attribute data may also be removed or deleted, and thus any count that was stored as an attribute would be unavailable for use in later processing as described in greater detail below.

Hash table 124, may be non-swappable, so that during sampling period 126, no counts 120, 121 or col IDs 122 are rest or removed—even during a delta merge or database update operation (which may clear attribute information). In an embodiment, the hash table 124 may be cleared or reset after providing a recommendation 134, on user request, or by another explicit clear or delete hash function or command.

As noted above, recommendation engine (RE) 132 may generate a recommendation 134 on how to improve the efficiency of data load or access operations across one or more columns of database 108. In an embodiment, the recommendation 134 may provide for more efficient data copy or data load operations when copying data from disk storage 112 into one or more columns or tables 106 of database 108.

In an embodiment, recommendation 134 may include both load unit 136 and granularity 138 indicators. Load unit 136 may refer to how data is loaded from disk storage 112 into a particular column of database 108, such as a full load or column load (CL) or a partial load or page load (PL). In an embodiment, PL may save on memory consumption, but may be slower relative to CL. In an embodiment, each column of database 108 may be individually configured for CL or PL. DARS 102 may provide a recommendation 134 for each monitored column as to whether CL or PL would best improve efficiency or increase memory utilization.

When CL is activated for a particular column, all of the data of a column is copied from data storage 112 into a column in memory. For example, if CL was activated for column A, then when column A is loaded into memory, all of the data values (A1, A2, and A3) of column A are copied from disk storage 112 into table 106A.

When PL is activated for a particular column, partial data loads may be enabled which allows for only a portion or subset of data to be selected from disk storage 112 and copied into memory. So, for example, if PL is activated for column B, then data may be added or removed from memory by smaller subsets of data, including one data record at a time. PL may also enable row identifiers to be used to load one specifically identified record at a time.

RE 132 may generate a load unit recommendation 136, indicating either PL or CL, for each monitored column of database 108. In an embodiment, recommendation 134 may exclude any columns where no data accesses 118 were detected during sampling period 126 (for which there is no corresponding entry in hash table 124).

Recommendation 134 may also include a granularity indicator 138. Granularity 138 may indicate to which data structures or data objects to apply a particular load unit recommendation 136. In a simple example, as just described, granularity 138 may indicate a column name or identifier (e.g., col ID 122) that indicates to which column in which table the particular load unit 136 is to be applied. For example, each of columns A, B, C, D, and E, may be indicated by granularity indicator 138 to have their own unique load unit recommendation 136.

Beyond just indicating specific columns to which to apply load unit 136, granularity indicator 138 may indicate to which tables 106 and/or schemas 140A, 140B to apply a particular load unit recommendation 138.

In an embodiment, RE 132 may perform operations for generating a load unit 136 recommendation 136 for each column of database 108 (that was monitored, or for which enough data was collected so as to generate load unit recommendation 136). Then, for example, if RE 132 determines that all of the columns belonging to a particular table 106 have the same load unit recommendation 136 (e.g., are all PL or CL), then instead of presenting or outputting or configuring a recommendation 132 for each specific column of the table 106, the recommendation may include a table name or identifier as the granularity indicator 138 and the load unit recommendation 136 to be applied to all of the columns of the table 106.

Additionally, RE 132 may determine whether all of the tables 106 that share a particular schema 140 include the same load unit recommendation 136. If so, then rather than providing individual table unit recommendations, granularity 138 may indicate the same of a particular schema 140 to which the load unit recommendation is to be applied to each of the tables 106 and consequently each of the columns.

In an embodiment, multiple tables 106 may share the same schema 140. In such an embodiment, RE 132 may compute a schema recommendation if all of the tables 106 sharing the same schema 140 have the same load unit recommendation 136. If each table 106 has its own unique schema 140, then no schema-based granularity 138 may be computed. In an embodiment, a single output recommendation 134 may include load unit 136 recommendations at the column level, table level, and schema level for a single sampling period 126, whereby each column is only accounted for once.

In an embodiment, RE 132 may compute recommendation 134 (including load unit recommendation 136 and/or granularity 138) based on the analysis of any different number of statistics or factors detectable about database 108 (including the particular columns thereof), memory and/or disk storage 112. Two examples of such factors are accumulated count 128 and density 130.

As noted above, hash table 124 may include multiple count values 120, 121 for each col ID 122 (that is accessed during sampling period 126). As part of generating recommendation 134, RE 132 may compute or receive an accumulated count value 128. Accumulated count 128 may be computed on a per-column basis. This may include adding up all of the count values 120, 121 corresponding to each col ID 122 (from hash table 124) and outputting a final accumulated count number 128. In an embodiment, a higher accumulated count number 128 for a particular column may indicate that a column-load (CL) load unit 136 should be used for the particular column, while PL may be used for lower accumulated counts 128.

In an embodiment, RE 132 may also take into account a column density 130 factor. Column density may be a measure of how many unique values out of a number of available values from a column were actually accessed during sampling period 126. For example, if a column has 10 values, and only 3 are accessed during the time, the density 130 may be 0.30 or 30%. In an embodiment, a higher density 130 may indicate that CL should be activated for a particular column, while PL may be used for a lower density 130.

In an embodiment, RE 132 may weigh accumulated count 128 and density 130 for each column to generate a load unit recommendation 136. In an embodiment, accumulated count 128 and density 130 may be weighed differently when applied to either different columns, tables 106, or schemas 141 of the same database 108.

Figure 2:
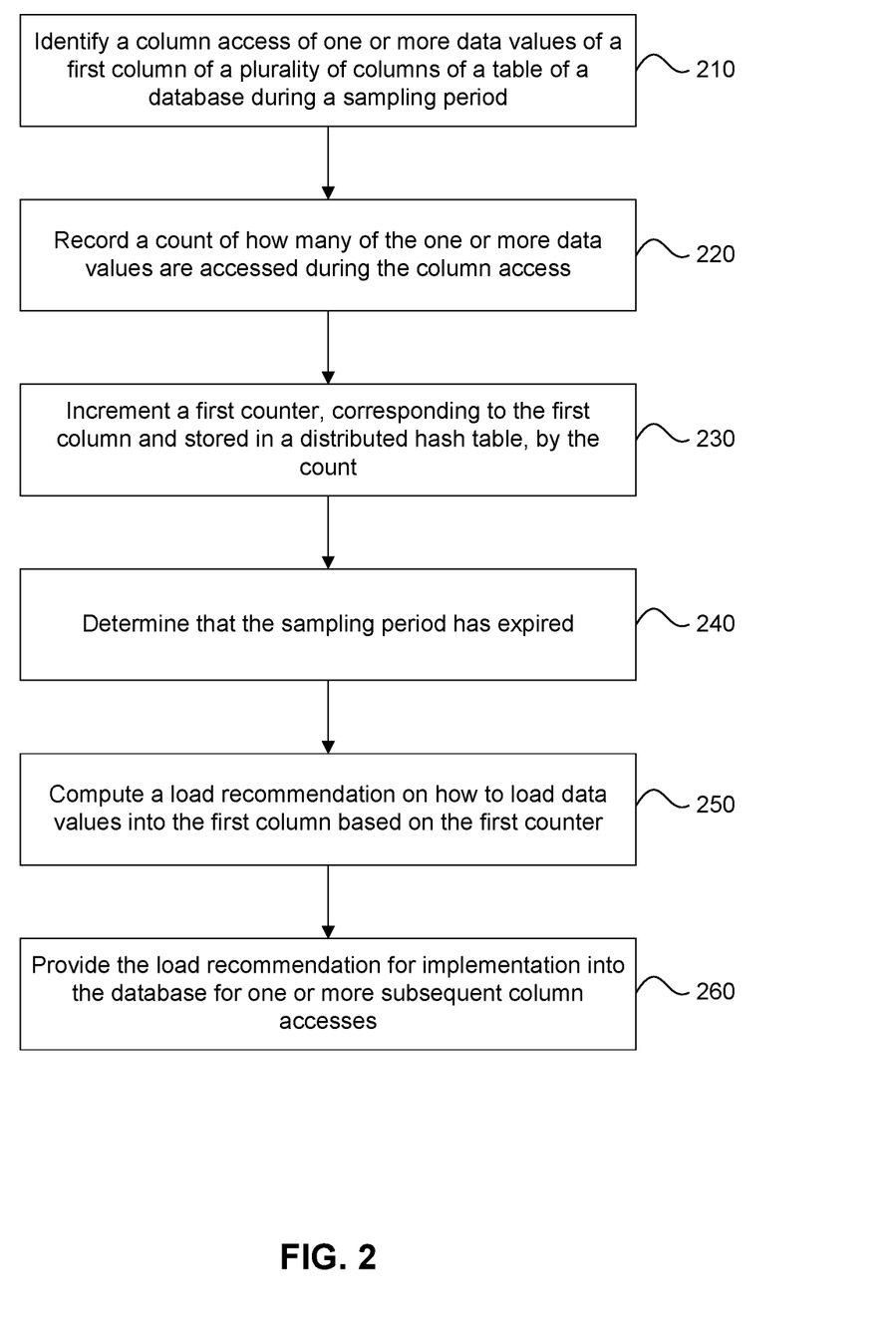
FIG. 2 is a flowchart illustrating example operations for providing a data access and recommendation system (DARS), according to some embodiments.

FIG. 2 is a flowchart 200 illustrating example operations for providing a data access and recommendation system (DARS), according to some embodiments. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art. Method 200 shall be described with reference to FIG. 1.

In 210, a column access of one or more data values of a first column of a plurality of columns of a table of a database is identified during a sampling period. For example, access monitor 116 may monitor the operations of database 108 using multiple different counters 114 that are configured to detect different types of column data accesses 118 when processing one or more queries 110 during a sampling period 126.

In 220, a count of how many of the one or more data values are accessed during the column access is recorded. For example, a particular counter 114 may detect a particular type of data access 118 corresponding to that counter. In an embodiment, the counter 114 may count each data value that is either read or retrieved/copied from a column as an individual data access 118. In an embodiment, each column of database may have its own access monitor 116 or counter 114 and write the same or shared distributed hash table 124.

In 230, a first counter, corresponding to the first column and stored in a distributed hash table, is incremented by the count. For example, counter 114 may update or submit an updated count 120 for one or more data accesses 118 detected for a particular column to hash table 124. Hash table 124 may then update the corresponding count value 120 for the identified column (e.g., as indicated by a col ID 122). In an embodiment, hash table 124 may be a distributed hash table that synchronizes the counts 120, 121 across multiple counters 114 operating across different computing devices.

In 240, it is determined that the sampling period has expired. For example, access monitor 116 may indicate that the sampling period 126 has ended for a particular counter 114 and thus may disable the counter 114. In an embodiment, different counters 114 may include different sampling periods 126, whereby each counter 114 stops counting at either the expiration of its own individual sampling period 126, or at the end of the last counter's 114 sampling period 126. For example, if a system includes two counters 114 each with a sampling period 126 of one million data accesses 118, both counters 114 may stop counting only when both counters 114 have tracked one million or more data accesses 118.

In 250, a load recommendation on how to load data values into the first column based on the first counter is computed. For example, RE may weigh an accumulated count 128 (which may include an accumulation of all the count values 120, 121 corresponding to a particular column) with a density 130 to identify a load unit recommendation 136, indicating an improved or optimized way to load data into the particular column from disk storage.

In 260, the load recommendation for implementation into the database for one or more subsequent column accesses is provided. For example, RE 134 may output recommendation 134 (including both load unit 136 and granularity 138) to a screen for a database administrator to implement on database 108. Or, for example, DARS 102 may be configured to modify the access or load mechanisms of database 108 according to recommendation 134. In an embodiment, DARS 102 may then log when the various recommendations 134 were implemented or activated. In an embodiment, DARS 102 may be configured to periodically re-run sampling period 126 and update recommendation 134.

Figure 3:
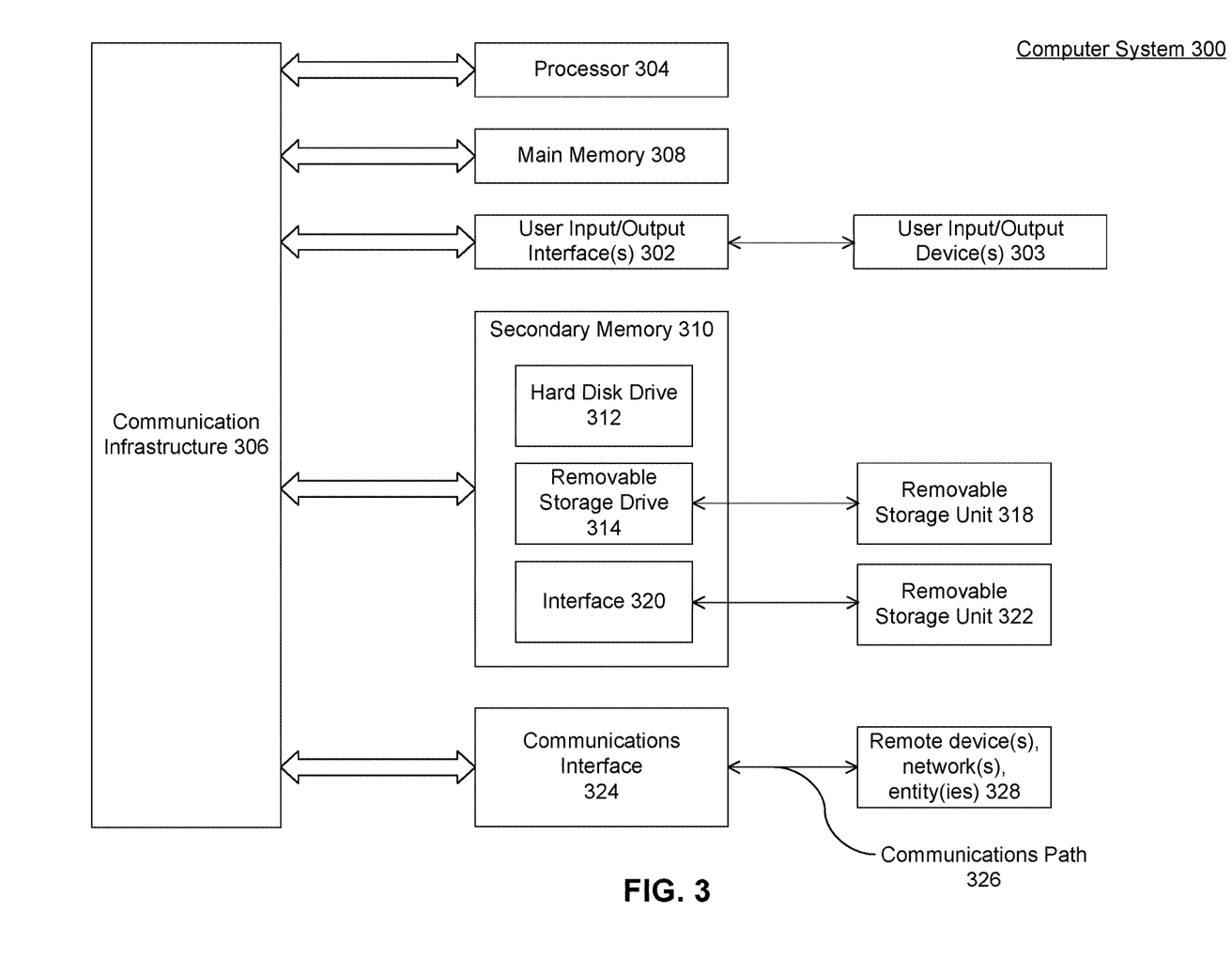
FIG. 3 is example computer system useful for implementing various embodiments.

Various embodiments may be implemented, for example, using one or more well-known computer systems, such as computer system 300 shown in FIG. 3. One or more computer systems 300 may be used, for example, to implement any of the embodiments discussed herein, as well as combinations and sub-combinations thereof.

Computer system 300 may include one or more processors (also called central processing units, or CPUs), such as a processor 304. Processor 304 may be connected to a communication infrastructure or bus 306.

Computer system 300 may also include customer input/output device(s) 303, such as monitors, keyboards, pointing devices, etc., which may communicate with communication infrastructure 306 through customer input/output interface(s) 302.

One or more of processors 304 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 300 may also include a main or primary memory 308, such as random access memory (RAM). Main memory 308 may include one or more levels of cache. Main memory 308 may have stored therein control logic (i.e., computer software) and/or data.

Computer system 300 may also include one or more secondary storage devices or memory 310. Secondary memory 310 may include, for example, a hard disk drive 312 and/or a removable storage device or drive 314. Removable storage drive 314 may be a floppy disk drive, a magnetic tape drive, a compact disk drive, an optical storage device, tape backup device, and/or any other storage device/drive.

Removable storage drive 314 may interact with a removable storage unit 318. Removable storage unit 318 may include a computer usable or readable storage device having stored thereon computer software (control logic) and/or data. Removable storage unit 318 may be a floppy disk, magnetic tape, compact disk, DVD, optical storage disk, and/any other computer data storage device. Removable storage drive 314 may read from and/or write to removable storage unit 318.

Secondary memory 310 may include other means, devices, components, instrumentalities or other approaches for allowing computer programs and/or other instructions and/or data to be accessed by computer system 300. Such means, devices, components, instrumentalities or other approaches may include, for example, a removable storage unit 322 and an interface 320. Examples of the removable storage unit 322 and the interface 320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 may further include a communication or network interface 324. Communication interface 324 may enable computer system 300 to communicate and interact with any combination of external devices, external networks, external entities, etc. (individually and collectively referenced by reference number 328). For example, communication interface 324 may allow computer system 300 to communicate with external or remote devices 328 over communications path 326, which may be wired and/or wireless (or a combination thereof), and which may include any combination of LANs, WANs, the Internet, etc. Control logic and/or data may be transmitted to and from computer system 300 via communication path 326.

Computer system 300 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 300 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 300 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 300, main memory 308, secondary memory 310, and removable storage units 318 and 322, as well as tangible articles of manufacture embodying any combination of the foregoing. Such control logic, when executed by one or more data processing devices (such as computer system 300), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 3. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method comprising:
   identifying, by a processor, a column access of one or more data values of a first column of a plurality of columns of a table of a database during a sampling period;
   recording a count of how many of the one or more data values are accessed during the column access;
   incrementing a first counter, corresponding to the first column and stored in a distributed hash table, by the count, wherein the distributed hash table stores a plurality of other counters corresponding to each of the plurality of columns of the table;
   determining that the sampling period has expired;

computing a load recommendation on how to load data values into the first column based on the first counter, wherein the load recommendation includes at least one of a full load of data values recommendation or a partial load of data values recommendation; and providing the load recommendation for implementation into the database for one or more subsequent column accesses.

2. The method of claim 1, wherein the computing comprises:
computing the load recommendation based on both a second counter corresponding to the first column, and the first counter, wherein the first counter and the second counter each count different types of column accesses that occurred on the first column during the sampling period.

3. The method of claim 1, wherein the database comprises a column-oriented database, wherein the one or more data values of the first column are loaded from a disk storage location into a memory location.

4. The method of claim 3, wherein the full load of data values recommendation comprises that when the one or more data values of the first column are loaded from the disk storage location into the memory location, all of the data values of the first column are copied into the memory location.

5. The method of claim 4, wherein the partial load of data values recommendation comprises that when the one or more data values of the first column are loaded from the disk storage location into the memory location, only a subset less than all of the data values of the first column are copied into the memory location.

6. The method of claim 1, wherein the computing comprises:
computing a granularity recommendation, included with the load recommendation, that all of the plurality of columns of the table use the same load recommendation.

7. The method of claim 1, wherein the computing comprises:
computing a granularity recommendation, included with the load recommendation, that all of the plurality of columns of a plurality of tables of the database using a similar schema use the same load recommendation.

8. The method of claim 1, wherein the computing comprises:
computing the load recommendation based at least in part on a column density corresponding to the first column, wherein the column density indicates a number of values of the first column are accessed relative to a total data size of the first column.

9. A system comprising:
a memory; and
at least one processor coupled to the memory and configured to perform operations comprising:
identifying, by the at least one processor, a column access of one or more data values of a first column of a plurality of columns of a table of a database during a sampling period;
recording a count of how many of the one or more data values are accessed during the column access;
incrementing a first counter, corresponding to the first column and stored in a distributed hash table, by the count, wherein the distributed hash table stores a plurality of other counters corresponding to each of the plurality of columns of the table;
determining that the sampling period has expired;

computing a load recommendation on how to load data values into the first column based on the first counter, wherein the load recommendation includes at least one of a full load of data values recommendation or a partial load of data values recommendation; and providing the load recommendation for implementation into the database for one or more subsequent column accesses.

10. The system of claim 9, wherein the computing comprises:
computing the load recommendation based on both a second counter corresponding to the first column, and the first counter, wherein the first counter and the second counter each count different types of column accesses that occurred on the first column during the sampling period.

11. The system of claim 9, wherein the database comprises a column-oriented database, wherein the one or more data values of the first column are loaded from a disk storage location into a memory location.

12. The system of claim 11, wherein the full load of data values recommendation comprises that when the one or more data values of the first column are loaded from the disk storage location into the memory location, all of the data values of the first column are copied into the memory location.

13. The system of claim 12, wherein the partial load of data values recommendation comprises that when the one or more data values of the first column are loaded from the disk storage location into the memory location, only a subset less than all of the data values of the first column are copied into the memory location.

14. The system of claim 9, wherein the computing comprises:
computing a granularity recommendation, included with the load recommendation, that all of the plurality of columns of the table use the same load recommendation.

15. The system of claim 9, wherein the computing comprises:
computing a granularity recommendation, included with the load recommendation, that all of the plurality of columns of a plurality of tables of the database using a similar schema use the same load recommendation.

16. The system of claim 9, wherein the computing comprises:
computing the load recommendation based at least in part on a column density corresponding to the first column, wherein the column density indicates a number of values of the first column are accessed relative to a total data size of the first column.

17. A non-transitory computer-readable device having instructions stored thereon that, when executed by at least one computing device, cause the at least one computing device to perform operations comprising:
identifying a column access of one or more data values of a first column of a plurality of columns of a table of a database during a sampling period;
recording a count of how many of the one or more data values are accessed during the column access;
incrementing a first counter, corresponding to the first column and stored in a distributed hash table, by the count, wherein the distributed hash table stores a plurality of other counters corresponding to each of the plurality of columns of the table;
determining that the sampling period has expired;

computing a load recommendation on how to load data values into the first column based on the first counter, wherein the load recommendation includes at least one of a full load of data values recommendation or a partial load of data values recommendation; and providing the load recommendation for implementation into the database for one or more subsequent column accesses.

18. The device of claim 17, wherein the computing comprises:

computing the load recommendation based on both a second counter corresponding to the first column, and the first counter, wherein the first counter and the second counter each count different types of column accesses that occurred on the first column during the sampling period.

19. The device of claim 17, wherein the database comprises a column-oriented database, wherein the one or more data values of the first column are loaded from a disk storage location into a memory location.

20. The device of claim 19, wherein the full load of data values recommendation comprises that when the one or more data values of the first column are loaded from the disk storage location into the memory location, all of the data values of the first column are copied into the memory location.

* * * * *